J. B. DAVIDSON.
DYNAMOMETER.
APPLICATION FILED MAY 10, 1916.
1,228,299.
Patented May 29, 1917.
3 SHEETS—SHEET 1.
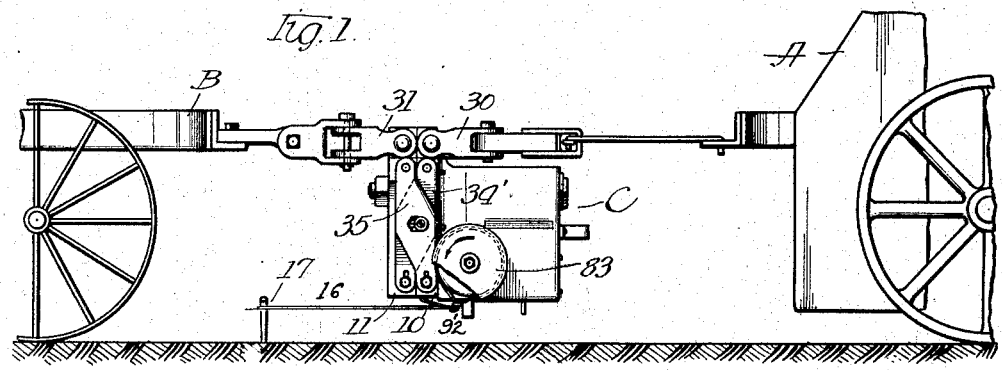

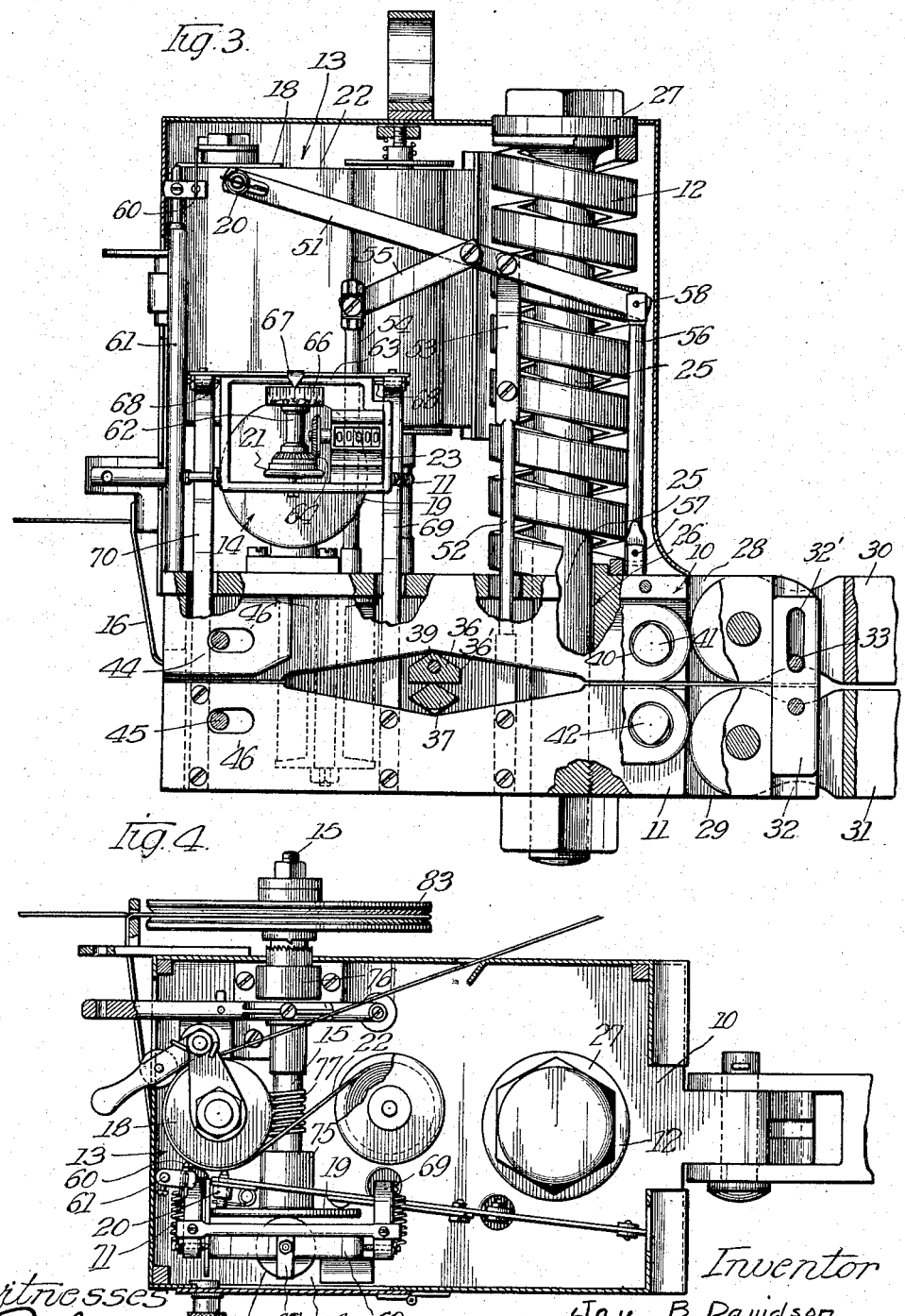

J. B. DAVIDSON.
DYNAMOMETER.
APPLICATION FILED MAY 10, 1916.
1,228,299.
Patented May 29, 1917.
3 SHEETS—SHEET 3.
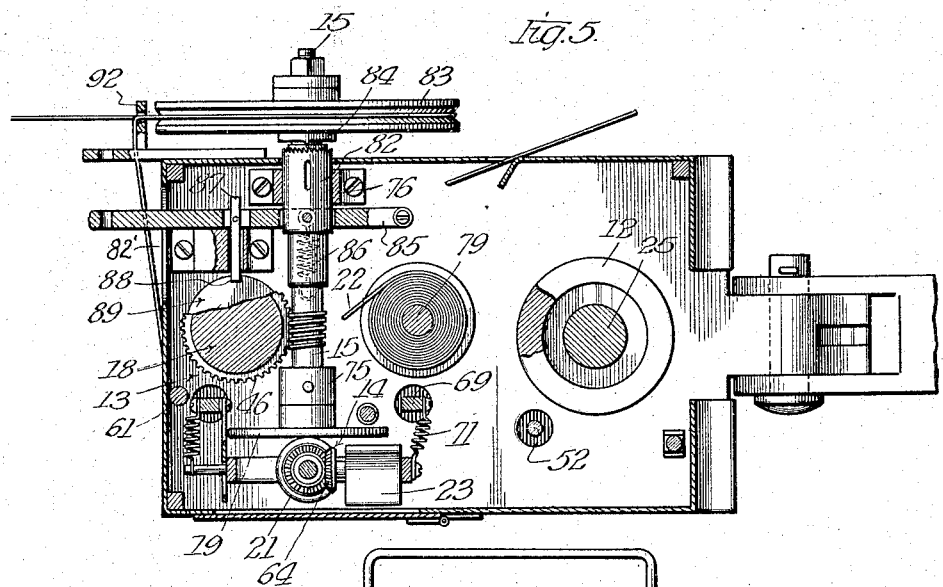
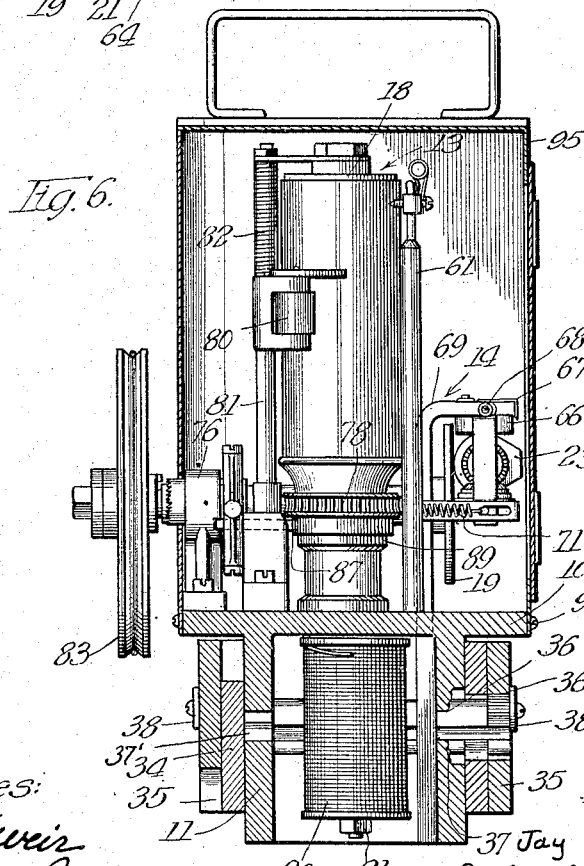
Witnesses:
Robert H Weir
Arthur W. Carbry
Inventor
Jay B. Davidson
By Bain & May
his Attys.

UNITED STATES PATENT OFFICE.

JAY B. DAVIDSON, OF DAVIS, CALIFORNIA.

DYNAMOMETER.

1,228,299.   Specification of Letters Patent.   Patented May 29, 1917.

Application filed May 10, 1916. Serial No. 96,489.

*To all whom it may concern:*

Be it known that I, JAY B. DAVIDSON, a citizen of the United States, residing at Davis, in the county of Yolo and State of California, have invented certain new and useful Improvements in Dynamometers, of which the following is a specification.

My invention relates to improvements in dynamometers, and some of its features are particularly devised for the provision of a traction-dynamometer, recording the power applied by a tractor, such as an engine or a draft animal, in pulling a trailer of some sort, such for example as an agricultural implement or a car. In some of its features the mechanism specifically shown in the present application is designed for use especially in connection with agricultural machinery, such as plows; and, therefore, (without intent, however, to limit the application of my invention to such use in its broader aspects) I will, for purposes of clearness, hereinafter describe my invention with that particular use in view.

The general object of my invention is to provide a traction dynamometer mechanism which is simple, rugged, and efficient, which may be employed with facility under varying conditions of use, and which may make its records both as a graphic curve showing coördinately the distance of travel and the tractive effort, from which the power consumption may be calculated and as a direct-reading, cumulative numerical record of power consumption.

Many other and further objects of my invention, satisfied by the embodiment of the invention herein shown, may best be understood by those skilled in the art by reference to the accompanying drawings and the following description, taken in conjunction with the appended claims.

In the drawings,

Figure 1 shows in exaggerated size and diagrammatic fashion a dynamometer constructed in accordance with my invention disposed in pendant position for use in connection with a tractor and a trailer, both of which are conventionally illustrated.

Fig. 2 shows the dynamometer detached, in front elevation.

Fig. 3 shows the same with parts of the casing and fragments of the mechanism broken away.

Fig. 4 is a plan view of the mechanism with the casing in section and parts broken away;

Fig. 5 is a horizontal sectional view taken on a plane passing through the mechanism directly above the counter.

Fig. 6 is a vertical sectional view taken on a plane just inside the left wall of the casing as shown in Fig. 3.

The tractor A may be assumed to be pulling the trailer B through draft-rigging that includes the dynamometer C. In general, the dynamometer comprises a fixed head 10 and a traction head 11, respectively, connected with the tractor and trailer, these heads separating more or less against the resistance of calibrated spring 12, as the force applied to move the trailer varies. The fixed head carries a curve-recording structure 13, and a numerical power-recorder 14, each actuated in harmony with both the rotation of a main shaft 15 and the relative displacement of the heads 10 and 11. The main shaft 15 rotates in accordance with the linear progress of the trailer, as (conveniently) through the action of a cord 16, secured at one end as to a ground stake 17 and engaging a pulley wheel on the shaft, and as the shaft rotates it drives a paper-feed-drum 18 of the curve-recorder and also a drive-disk 19 of a change-speed friction gear of the numerical recorder. As the two heads 10 and 11 separate or approach in accord with variations in force applied, the marking pencil 20 of the curve-recorder is moved across the paper strip and also the friction pinion 21 of the numerical-recorder gear is shifted across the face of the disk 19. Thus on the paper strip record, 22, a curve is recorded showing, longitudinally, the distance traveled and, laterally, the pull applied at each point of such travel, so that total power consumption may be calculated by the diagram-area; and on the numerical record or counter 23 the total power-consumption is numerically expressed.

In the drawings the fixed head 10 and the movable head, or traction head, 11 are two steel blocks, relatively displaceable against the tension of the carefully calibrated spring 12 that is positioned by a stem 25 rigidly secured in the traction head 11, passing slidably through a guide aperture 26 in the fixed head 10 and affording, at its upper end, an abutment 27, between which and the fixed head 10 the spring 12 is located.

The two heads are related for relative displacement only on a right line, while maintaining their parallelism, thus enabling the separating forces to be applied at any point on the heads, and enabling the spring 12 and the recording devices 13 and 14 to be located at the points most convenient for mechanical construction without affecting the accuracy of the device. Because of the intended employment of this particular construction in a draft rigging, the two heads 10 and 11 have end extensions 28 and 29 that receive the pivoted shackles 30 and 31 respectively that are to be linked to the tractor and trailer, so that in use the shackles act as suspension means from which the body of the device hangs pendant as shown in Fig. 1. These extensions are preferably connected by a guide bar 32 fixed in a groove in extension 29 and riding in a corresponding groove in extension 28 within the limit permitted by a slot 32' made in the slide bar to receive the pin 33 fixed in the extension 28.

A parallel link motion that satisfactorily accommodates the parallel displacement of the two heads under the pull of the end-connected shackles, consists of duplicate, crossed, lever-pairs 34, 35 and 34' and 35', on the front and rear sides of the instrument, the cross lever pairs being centrally pivoted together, and the ends of the respective levers adjacent the shackles being pivotally connected to the heads 10 and 11, while their remote ends are connected slidingly to the heads 11 and 10.

While different forms of mechanism for maintaining the desired parallelism of the fixed head and traction head may be employed, in the broader aspects of my invention, I have found that the desired results may effectively and simply be produced by the particular construction herein shown to provide for the self-centering joint pivotal connection between the four levers constituting the two pairs. The side members of the head blocks are cut away to leave free a transverse passage between such blocks through which may pass two pivot bars 36 and 37, the former having a knife-edge opposed to the flat face of the other, so as to afford a knife-edge pivot at the center of the lever system. Bar 36 has a half-head 36' of angular contour, fitting into an angular opening of the inner levers 35, 35', fixing it against rotation with respect to such levers while leaving it freely rotatable with respect to the levers 34, 34'. Correspondingly, by heads 37', the bar 37 is fixed in levers 34, 34', but left free as to levers 35, 35'. Washers 38, screwed as at 39, to opposite ends of the bar 36 overlap both the outer levers and the ends of the pivot bar 37 retain the pivot members against displacement in the direction of their length.

The crossed levers, at their ends adjacent the shackles have bushed apertures 40 receiving knife-edge pivots 41, 42, mounted on the heads 10, 11, and at their remote ends they have slots 43 receiving bolt-pins 44 and 45 extending from side to side through slots 46 in the heads 10, 11, so that the crossed levers, with their floating pivot, fixed pivotal connections at one end and sliding pivotal connections at the other end, form a very effective parallel-link-motion device.

Relative displacement of the two heads 10 and 11 against the tension of the spring 12 acts, with respect to the curve recording mechanism 13, to impart a straight transverse movement to the marking pencil 20 that travels across the movable record strip 22; and with respect to the cumulative numerical recorder such movement between the heads acts to shift pinion 21 across disk 19 to vary the gear ratio between the recording counter and the rotatable drive shaft of the two recording mechanisms.

Specifically the marking pencil 20, pressed against the paper strip by a spring 50, is carried in the lever arm 51 that is moved by means of a slide rod 52 which is mounted in the movable head 11 and has a pivoted link connection 53 with the pencil arm 51. A substantially straight line movement of the pencil across the strip is preferably secured by a suitable compound pivotal mounting of the arm 51. Thus, a fixed stem 54 carried by the fixed head 10 has a pivotal link connection 55 with the arm 51, and a fulcrum-link 56, pivoted at its lower end at 57 to the fixed head 10 has its upper end pivoted as at 58 to the extremity of arm 51. These connections, when properly proportioned substantially as shown, will result in the requisite movement to the arm 51.

A spring-pressed pencil 60 is held in stationary position on a post 61 to mark on the moving strip 22 a datum line coincident with the normal or initial position of pencil 20.

Of the gearing for the numerical record mechanism 14, the disk 19 is fixed, against bodily displacement, but the friction pinion 21 coacting with the disk face is bodily shiftable diametrically across said face. Thus the pinion 21 on shaft 62 is mounted in a frame 63 that carries also the counter 23. The pinion 21 is geared as at 64, to the shaft of the counter 23, and the gearing ratio of the counter and calibration of spring 12 are such that the counter may read directly in terms of foot-pounds. Preferably for fractional computation the shaft 62 may carry a suitably-marked fraction wheel 66 associated with a marker point 67 on the frame 63.

The frame 63, which is preferably rectangular, may conveniently be pivoted as at 68 near its top between connected forwardly-bent up-rights 69 and 70, the bottoms of which extend through suitable openings in the fixed head 10 and are carried by the movable head 11. Springs 71 connect the pivoted frame 63 and the vertical members 69 and 70 and serve to hold the friction pinion 21 in effective contact with the friction disk 19.

The main shaft 15 that drives the friction disk 19 is supported in bearings 75 and 76 and between them it carries a worm 77 that meshes with the worm wheel 78 to drive the paper feed wheel 18 for the record strip 22. Such strip is drawn from a paper supply roll 79, and passes around the feed roll 18 against which it is held by a roller 80 mounted on stem 81 and pressed into engagement with the paper by spring 82, the paper passing thence through a suitable outlet 82' in the casing, as shown in Fig. 5. The main shaft 15 will of course be driven in accordance with some desired factor of the calculation to be made. In the instance herein shown it is driven in accordance with the distance of travel of the trailer. Preferably the mechanism that drives the main shaft is disconnectible from said shaft to throw the apparatus out of operation, and preferably means are provided for automatically limiting the action of the driving mechanism so as to give a predetermined number of rotations of the main shaft as an arbitrary basis of calculation. In the specific construction shown the main shaft carries, slidably thereon, and rotatable therewith, a clutch sleeve 82, and upon the extremity of the shaft there is mounted a lone drive pulley 83 carrying a clutch element 84 for coaction with the clutch sleeve 82. The movable clutch member 82 is axially shiftable by a shifter lever 85 that is normally retracted by spring 86 and, for giving the desired automaticity of clutch release after a predetermined number of operations said shifter lever is provided with a dog 87 that, when the lever is retracted by its spring seats in a notch 88 in a flange 89 of the feed roller 18. If the clutch is thrown into operating position, retracting the dog 87 from its notch, the pulley 83 may be rotated a predetermined number of times, say, 50, before the notch 88 is again positioned to receive the dog 87 and then the dog automatically drops into the notch throwing the clutch out of operation, unless the shifter lever is intentionally held over against the tension of spring 86 during the passage of the notch 88 past the end of the dog 87.

As a convenient means for operating the pulley wheel 83 a cord-spool 90 is provided, rotatably mounted on spindle 91 in a recess in the head members 10 and 11, the cord 22 being led through a suitable guide 92 around the pulley wheel 83 and to the ground stake 17.

To facilitate the handling of the apparatus a suitable housing or cover 95 is preferably provided, screwed as at 96 to the flanges of the fixed head 10, and having suitable orifices, including orifice closed by door 97 in front of the recording mechanism.

In the operation of the device the tractor, trailer and dynamometer are connected as shown in Fig. 1, the cord 22 is attached to a ground stake, and the tractor is started in operation. Any stage of the run of the tractor the shifter lever 85 may be moved to connect the theretofore-idly-running pulley 83 with the main shaft 15 so as to begin the recording operation. Recording operations continue until the shifter-lever dog 87 reseats in the notch 88 after complete rotation of the paper-strip feed-roller, and of course the travel of the trailer necessary to produce this result may be made anything desired by appropriate gearing. In practice I have made the distance 50 feet, the pulley 83 having an effective circumference of one foot. While the main shaft is running, the paper strip is fed forward and the driving disk 19 is rotated, both in accordance with the distance of travel. The pull of the tractor separating the fixed head 10 and traction head 11 against the tension of spring 12, moves the recording pencil 20 transversely of the traveling paper strip, and also moves the friction pinion 21 diametrically across the face of the driving disk 19 from the center toward the periphery thereof, so that on the paper strip there is charted a continuing curve representing, longitudinally of the paper strip, the distance of travel, and, transversely of the strip, the tractive effort. On the friction gearing for the counter rotation of the main shaft in accordance with distance of travel, and the automatic shifting of the gear ratio between the driving disk and driven pinion in accordance with tractive effort, result in the totaling on the counter of these factors in foot-pounds. Of course for many computations that may be desirable a factor of time may be established by a stop watch that might be associated with the apparatus for operation to start and stop its timing action in accordance with the movements of the shifter lever 85. This I deem to be too obvious to require illustration or further explanation.

It will be understood that while for purposes of clear disclosure and the satisfactory construction of dynamometers embodying my invention I have shown and described in considerable detail specific forms and arrangements of parts, that my invention in its broader aspects is not limited to the details of specific embodiment herein shown, and that, within the scope of the appended claims, many changes may be made in the embodiment of the invention without departing from its spirit and intendment.

Having described my invention, what I claim is:—

1. A dynamometer comprising two separable parts, means for resisting separation of said parts, a recorder mechanism arranged for movement in accordance with the distance of dynamometer travel, a coöperating recorder mechanism for movement in accordance with relative displacement of the parts, said mechanisms coöperating to record the operation of the dynamometer, and means for automatically actuating the first said recorder mechanism through a predetermined distance of travel.

2. A dynamometer comprising heads, connections therebetween permitting separation of said heads, a recorder part arranged for rotation in accordance with distance of travel, and carried by one of said heads, a coöperating recorder part for movement in accordance with relative displacement of the heads, said parts coöperating to record the operation of the device, means for automatically actuating the first said recorder part through a predetermined distance of travel, and a calibrated spring opposing separation of said heads.

3. A traction dynamometer comprising parallel heads, shackles connected to like extremities of said heads, parallel link motion connections between said heads to maintain them in parallelism in their separating movements under the pull of the shackles, a spring opposing separation of said heads, a recorder part operable in accordance with distance of travel, carried by one of said heads, a coöperating recorder part displaceable relative to the first in accordance with the separation of the two heads and means for automatically actuating the first said recorder part through a predetermined distance of travel.

4. In a dynamometer of the class described, the combination of a fixed head, a movable head, a stem carried by the one head extending through the other head near one end thereof, a spring encircling said stem and abutting against the stem and the appropriate head, tending to maintain said heads against separation, guiding mechanism permitting the separation of said heads only in substantial parallelism, a stem carried by the movable head extending through the fixed head, a marking arm operable by said last mentioned stem, a paper strip coöperating with said marking arm, and means for moving said paper strip in accordance with the distance of travel.

5. In a dynamometer, the combination of parallel heads, connections between said heads comprising two pairs of crossed levers on opposite sides of the heads, each lever connected at opposite ends with the opposite heads, the connections at one end being pivotal and the other being slidingly pivotal, fulcrum blocks extending transversely between the heads connecting the lever pairs on opposite sides of the head, said fulcrum blocks jointly providing a knife edge pivot adjacent the center of the lever system and each of said blocks being connected against rotation with two of the levers of opposite pairs; means for separating said heads, spring means opposing the separation of said heads, and means for recording the separation of said heads.

6. In a traction dynamometer, the combination of a pair of separable heads, spring means for opposing separation of said heads, a shaft carried by one of said heads, a cord operable pulley thereon, a record strip driven by said shaft, a marker carried by said head, means for moving said marker operable by the separation of said heads.

7. In a traction dynamometer, the combination of a pair of separable heads, a drive shaft carried by one of said heads, a cord operable pulley carried by said shaft, a disk carried by said shaft, a counter, a friction pinion for operating said counter coöperating with said disk, and means connected with the other head for moving said friction pinion transversely of said friction disk in accordance with the separation of the heads.

8. In a device of the character described, the combination of a relatively fixed head, a drive shaft thereon carrying a friction disk, a relatively movable head, means opposing the separation of said heads, a frame carried by the relatively movable head, a friction pinion carried by said frame, resilient means pressing said pinion against the face of said disk, and a counter operated by said friction pinion.

9. In a traction dynamometer, the combination of draft-shackles, fixed and traction heads respectively carried by said shackles, a stem extending through said heads, and encircled by a spring opposing separation of said heads, means for maintaining said heads in parallelism in their separating movements, a cord-delivering spool carried by one of said heads, a main shaft on the fixed head, a cord receiving wheel loose on said shaft, clutch means for conducting said wheel with said shaft, and graphic and numerical recording means comprising paper strip moving mechanism and a friction disk operated by said shaft, and a marking instrument and friction pinion controlled by the traction heads and movable by separation of said heads, and a counter operated by the friction pinion.

10. In a traction dynamometer, the combination of draft-shackles, fixed and traction heads respectively carried by said shackles, a stem extending through said heads, and encircled by a spring opposing separation of said heads, means for maintaining said heads in parallelism in their separating movements, a cord-delivering spool carried by one of said heads, a main shaft on the fixed head, a cord receiving wheel loose on said shaft, clutch means for conducting said wheel with said shaft, means for throwing the clutch into operation, and automatic means operable from said shaft to release said clutch after a predetermined number of rotations of said shaft, and graphic and numerical recording means comprising paper strip moving mechanism and a friction disk operated by said shaft, and a marking instrument and friction pinion controlled by the traction head and movable by separation of said heads, and a counter operated by the friction pinion.

In testimony whereof I hereunto set my hand in the presence of two subscribing witnesses.

JAY B. DAVIDSON.

In the presence of—
JULIA B. GRAY.
TRACY R. KELLEY.

Copies of this patent may be obtained for five cents each, by addressing the "Commissioner of Patents, Washington, D. C."